US006742805B2

(12) United States Patent
Hill

(10) Patent No.: US 6,742,805 B2
(45) Date of Patent: Jun. 1, 2004

(54) MULTI-LAYERED INFLATABLE CURTAIN

(75) Inventor: Bruce R. Hill, Bloomfield Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/847,566

(22) Filed: May 2, 2001

(65) Prior Publication Data

US 2002/0163167 A1 Nov. 7, 2002

(51) Int. Cl.[7] ..................... B60R 21/16; B60R 21/22
(52) U.S. Cl. ..................... 280/730.2; 280/743.1
(58) Field of Search ................ 280/730.2, 743.1; 139/389, 390; 442/203, 205, 206, 207, 286, 148; 428/36.2, 36.1

(56) References Cited

U.S. PATENT DOCUMENTS

| | | | |
|---|---|---|---|
| 3,991,249 A | | 11/1976 | Yamashita et al. |
| 4,284,682 A | * | 8/1981 | Frosch et al. ............... 442/139 |
| 5,104,727 A | | 4/1992 | Wnenchak |
| 5,114,180 A | | 5/1992 | Kami et al. |
| 5,240,283 A | * | 8/1993 | Kishi et al. ................ 280/729 |
| 5,302,432 A | * | 4/1994 | Shigeta et al. ............. 428/36.1 |
| 5,452,914 A | | 9/1995 | Hirai |
| 5,505,485 A | | 4/1996 | Breed |
| 5,651,395 A | | 7/1997 | Graham et al. |
| 5,772,238 A | | 6/1998 | Breed et al. |
| 5,797,621 A | * | 8/1998 | Ono ........................ 280/730.2 |
| 5,863,068 A | | 1/1999 | Breed |
| 5,879,767 A | | 3/1999 | Matsushima et al. |
| 6,010,149 A | * | 1/2000 | Riedel et al. ............ 280/730.2 |
| 6,056,316 A | * | 5/2000 | Yamaji et al. ............ 280/730.2 |
| 6,177,366 B1 | * | 1/2001 | Li .............................. 442/71 |
| 6,296,276 B1 | * | 10/2001 | Ritter ...................... 280/743.2 |
| 6,328,334 B1 | * | 12/2001 | Kanuma ................... 280/730.2 |
| 6,350,709 B1 | * | 2/2002 | Veiga ......................... 442/71 |
| 6,451,715 B2 | * | 9/2002 | Li et al. ....................... 442/76 |
| 6,458,724 B1 | * | 10/2002 | Veiga et al. ................... 442/76 |
| 2002/0122908 A1 | * | 9/2002 | Li et al. ..................... 428/36.2 |

FOREIGN PATENT DOCUMENTS

| | | | | |
|---|---|---|---|---|
| JP | 10076903 A | * | 3/1998 | |
| JP | 10166977 A | * | 6/1998 | |
| JP | 11091488 A | * | 4/1999 | |
| WO | WP 97/37874 | * | 10/1997 | |

OTHER PUBLICATIONS

Japanese Patent Document 08–026062—English Abstract & translation included.
U.S. Provisional application No. 60/229,112, corresponding to U.S. patent application Publication No. U.S. 2002/0122908 A1.

* cited by examiner

*Primary Examiner*—Ruth Ilan
(74) *Attorney, Agent, or Firm*—Tarolli, Sundheim, Covell & Tummino L.L.P.

(57) ABSTRACT

Apparatus (10) for helping to protect an occupant of a vehicle (12) that has a side structure (16) and a roof (18) includes an inflatable vehicle occupant protection device (14). The protection device (14) is inflatable away from the vehicle roof (18) into a position between the side structure (16) of the vehicle (12) and a vehicle occupant. The protection device (14) includes first and second overlying panels (40 and 42) that are interconnected to define an inflatable volume (50). The first panel (40) includes a first predetermined number of layers of material (94) and the second panel (42) includes a second predetermined number of layers of material (90 and 92) greater than the first predetermined number of layers.

16 Claims, 3 Drawing Sheets

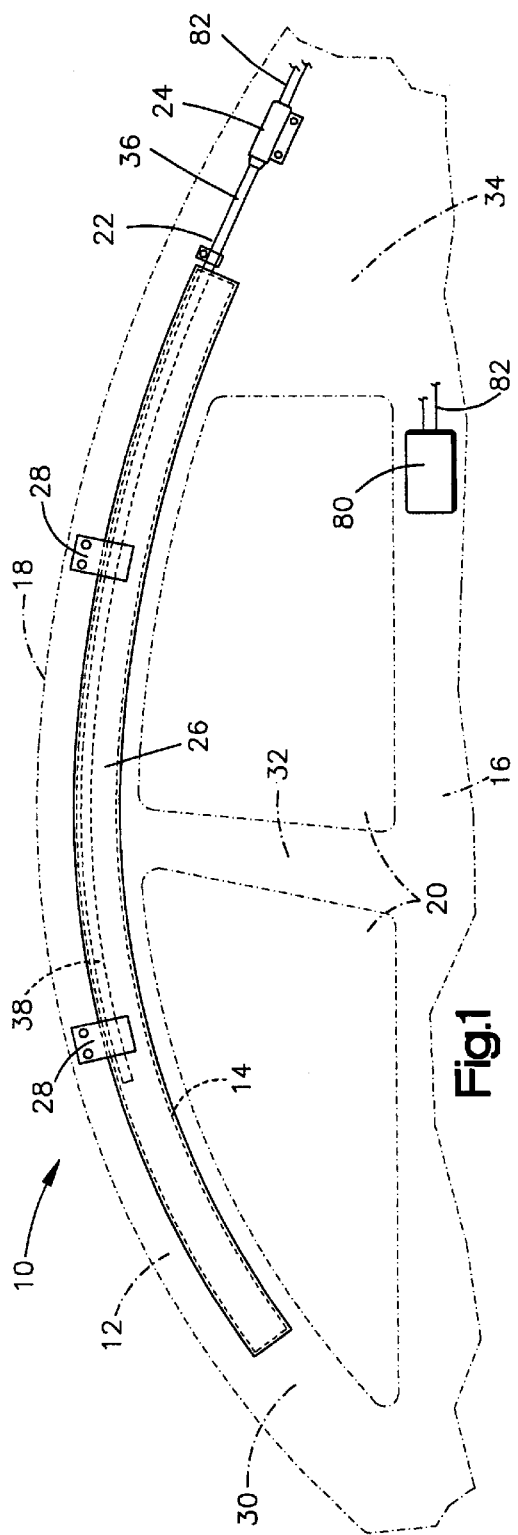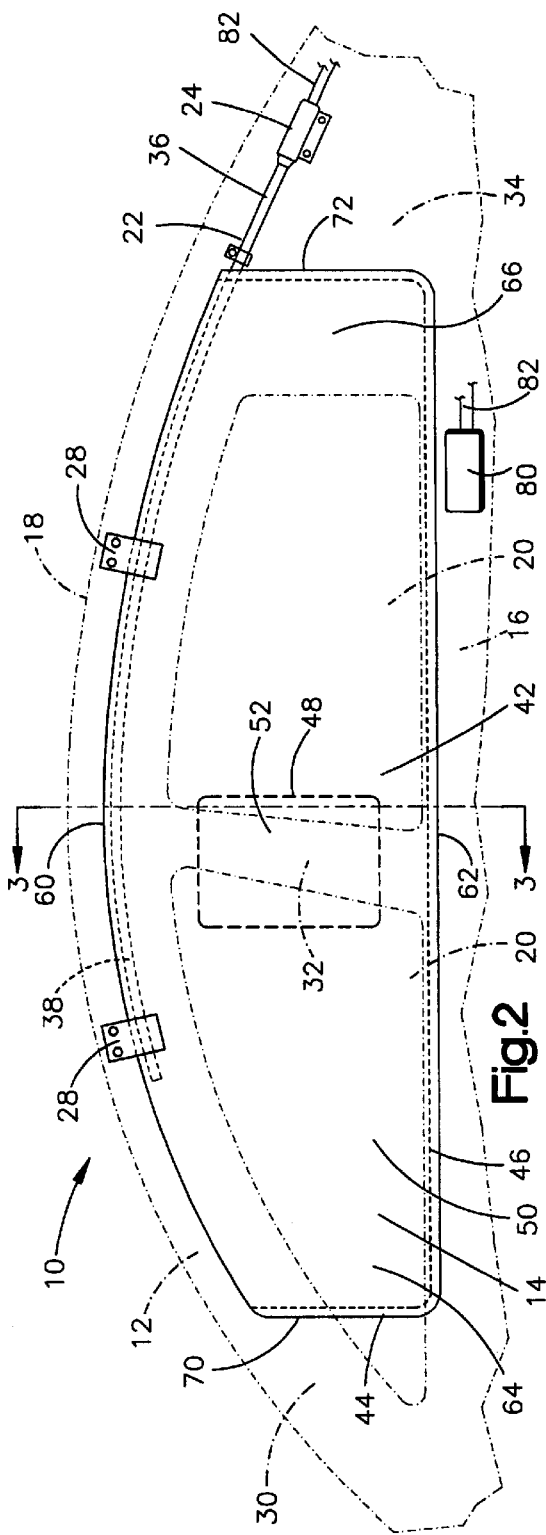

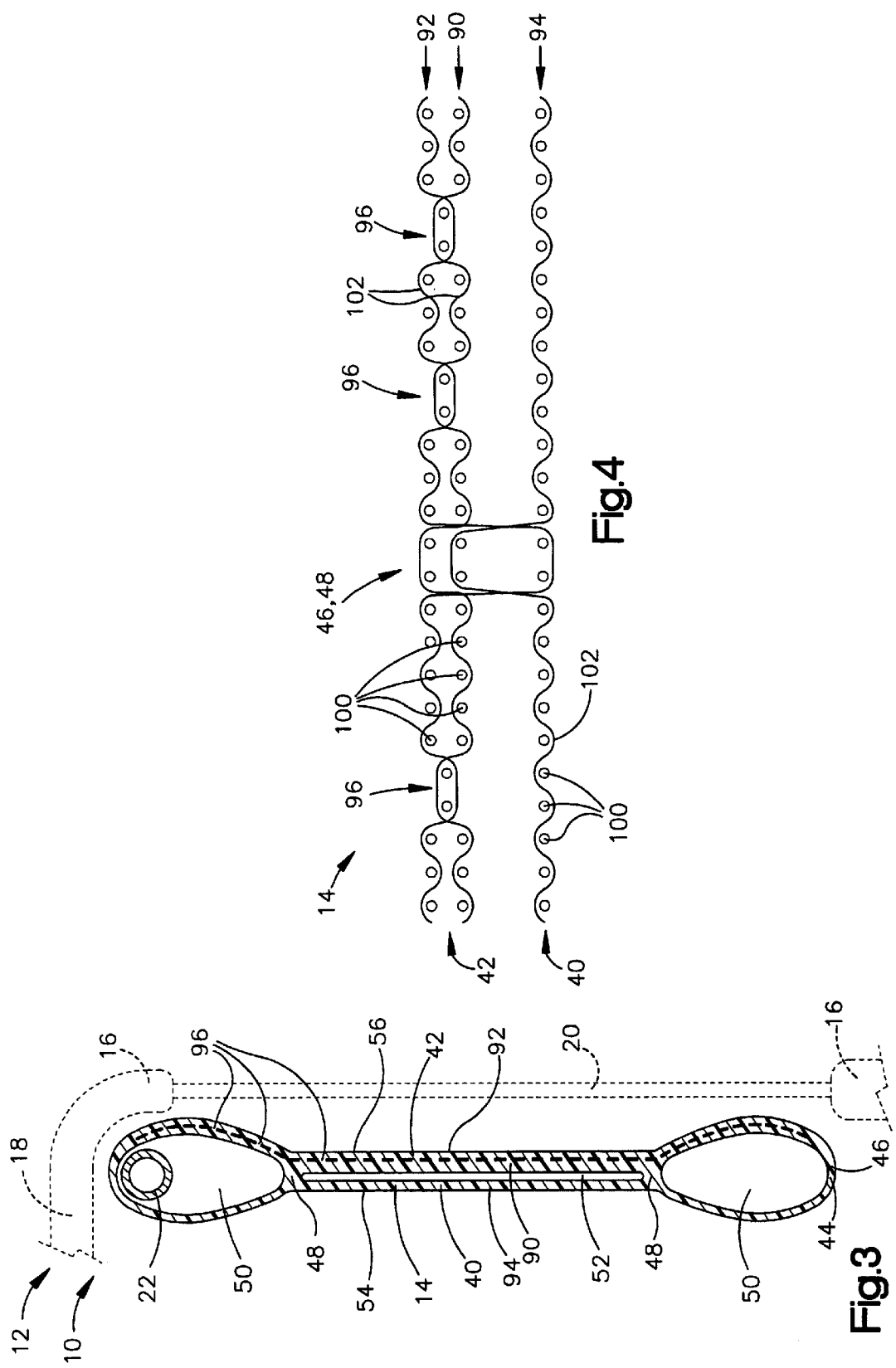

MULTI-LAYERED INFLATABLE CURTAIN

FIELD OF THE INVENTION

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain. The inflatable curtain inflates away from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. The inflatable vehicle occupant protection device includes first and second overlying panels that are interconnected to define an inflatable volume. The first panel includes a first predetermined number of layers of material and the second panel includes a second predetermined number of layers of material, which is greater than the first predetermined number of layers.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant, illustrating the apparatus in a deflated condition, according to a first embodiment of the invention;

FIG. 2 is a schematic view of the apparatus of FIG. 1 in an inflated condition;

FIG. 3 is a sectional view of the apparatus taken generally along line 3—3 in FIG. 2;

FIG. 4 is a magnified schematic view illustrating the construction of a portion of the apparatus of FIGS. 1–3;

DESCRIPTION OF THE PREFERRED EMBODIMENTS

Figure 6:
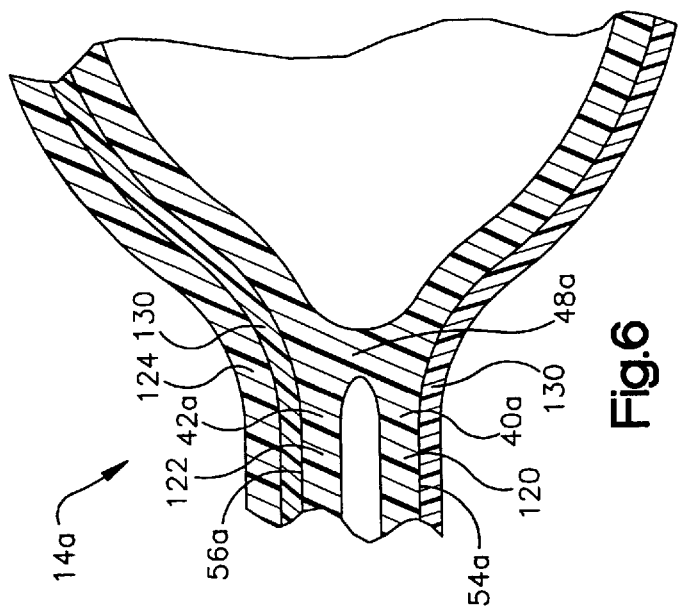
FIG. 6 is a magnified view of a portion of the apparatus of FIG. 5.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes side windows 20, an A pillar 30, a B pillar 32, and a C pillar 34. An inflator 24 is connected in fluid communication with the inflatable curtain 14 through a fill tube 22.

The fill tube 22 has a first end portion 36 for receiving fluid from the inflator 24. The fill tube 22 may be connected directly to the inflator 24 or a manifold (not shown) may connect the fill tube to the inflator. The fill tube 22 has a second end portion 38 disposed in the inflatable curtain 14. The fill tube 22 may be constructed of any suitable material, such as plastic, metal or fabric. As a further alternative, those skilled in the art will recognize that the fill tube 22 may be omitted, in which case the inflator 24 may be connected directly to the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14 and the housing 26 have an elongated configuration and extend along the vehicle roof 18 and along the side structure 16 of the vehicle 12 above the side windows 20. The fill tube 22, inflatable curtain 14 and housing 26 are connected to the vehicle 12 by known means such as brackets 28.

As best illustrated in FIG. 3, the inflatable curtain 14 comprises first and second panels 40 and 42 that are arranged in an overlying manner. The first and second panels 40 and 42 are interconnected along at least a portion of a perimeter 44 (FIGS. 2 and 3) of the inflatable curtain 14 to form a perimeter connection 46 of the curtain. The perimeter connection 46 helps to define an inflatable volume 50 of the curtain. The first and second panels 40 and 42 may also be interconnected within the perimeter 44 at interior connections 48 to form non-inflatable portions 52 of the inflatable curtain 14. Outer surfaces 54 and 56 of the first and second panels 40 and 42, respectively, may be coated with a gas impermeable material (not shown), such as urethane or silicone, and thus may have a substantially gas-tight construction.

The perimeter 44 is defined at least partially by an upper edge 60 (FIG. 2) of the inflatable curtain 14, an opposite lower edge 62 of the curtain, and front and rear portions 64 and 66, respectively, of the curtain spaced apart horizontally along the upper and lower edges. In the embodiment illustrated in FIG. 2, the front and rear portions 64 and 66 of the inflatable curtain 14 are partially defined by front and rear edges 70 and 72, respectively, that are spaced horizontally apart along the upper and lower edges 60 and 62 and extend vertically between the upper and lower edges. The front and rear edges 70 and 72, however, could be omitted and the upper and lower edges 60 and 62 could be extended until they intersect, in which case the front and rear portions 64 and 66 would be defined by the intersecting upper and lower edges. Also, while the front and rear edges 70 and 72 are illustrated as being generally vertical, they could extend at some other angle between the upper and lower edges 60 and 62.

The vehicle 12 includes a sensor mechanism 80 (shown schematically in FIGS. 1 and 2) for sensing a side impact to the vehicle 12 and/or a rollover of the vehicle 12. The sensor mechanism 80 actuates the inflator 24 in response to the sensing of a side impact or a vehicle rollover. In the event of a rollover of the vehicle or a side impact to the vehicle 12 for which inflation of the curtain 14 is desired, the sensor mechanism 80 provides an electrical signal over lead wires 82 to the inflator 24. The electrical signal causes the inflator 24 to be actuated in a known manner. The inflator 24 discharges fluid under pressure through fill tube 22, which directs the fluid into the inflatable curtain 14.

The inflatable curtain 14 inflates under the pressure of the inflation fluid from the inflator 24. The housing 26 (FIG. 1) opens, and the inflatable curtain 14 inflates away from the roof 18 in a downward direction as shown in the drawings and in a downward direction with respect to the direction of forward vehicle travel into the position illustrated in FIGS. 2 and 3. The inflatable curtain 14, when inflated, is positioned between the side structure 16 of the vehicle 12 and any occupant of the vehicle. When the inflatable curtain 14 is in the position illustrated in FIGS. 2 and 3, the second panel 42 (FIG. 3) is in an outboard position, adjacent the side structure 16 of the vehicle 12 between the first panel 40 and the side structure.

The inflatable curtain 14, when inflated, extends between the A pillar 30 and the C pillar 34 and overlies at least a portion of the A pillar, B pillar 32, and C pillar of the vehicle 12. The inflatable curtain 14 could, however, extend between the A pillar 30 and B pillar 32 only, or between the B pillar 32 and C pillar 34 only. As a further alternative, in a vehicle having a D pillar (not shown), the inflatable curtain 14, when inflated, could extend between the A pillar and the D pillar.

The inflatable curtain 14, when inflated, helps to protect a vehicle occupant in the event of a vehicle rollover or a side impact to the vehicle 12. The inflatable curtain 14, when inflated, helps to absorb the energy of impacts with the curtain and helps to distribute the impact energy over a large area of the curtain.

During a side impact or a vehicle rollover, the second panel 42 of the inflatable curtain 14, being in an outboard position, adjacent the side structure 16 of the vehicle 12, may be especially susceptible to puncture, abrasion, or other physical damage. For example, in the event of a side impact, the second panel 42 may come into contact with broken glass or sheet metal from the vehicle 12 or another vehicle involved in the side impact. In the event of a rollover, the second panel 42 may come into contact with broken glass or sheet metal from the vehicle 12, or the roadway upon which the vehicle is travelling. Such punctures, abrasions or other physical damage to the second panel 42 may cause the inflatable curtain 14 to deflate, which may reduce the ability of the inflatable curtain to help protect an occupant of the vehicle 12. Also, objects that penetrate the inflatable curtain 14 could pass through the curtain and contact an occupant of the vehicle.

As a feature of the present invention, the second panel 42 is constructed to have a wear resistance greater than the wear resistance of the first panel 40. As illustrated in FIG. 3, the second panel 42 is constructed of overlying first and second layers of material 90 and 92, respectively, whereas the first panel 40 is constructed of a single layer 94 of material. The first and second layers 90 and 92 of the second panel 42 extend substantially over the entire area of the second panel. The multiple layers of the second panel 42 help to increase the wear resistance of the second panel and also help prevent puncture, abrasion, or other physical damage to the second panel. The multiple layers of the second panel 42 thus help prevent deflation of the inflatable curtain 14.

The first and second panels 40 and 42 are preferably constructed of a woven fabric, such as nylon. The inflatable curtain 14 is preferably formed by weaving the layer 94 of the first panel 40 and the layers 90 and 92 of the second panel 42 simultaneously. The first and second panels 40 and 42 are interwoven to form the perimeter connection 46 and the non-inflatable portion 52. The first and second layers 90 and 92 of the second panel 42 are interconnected at predetermined locations 96 on the second panel by interweaving the first and second layers. The inflatable curtain 14 thus has a woven one piece construction. This can be accomplished by weaving the inflatable curtain 14 using known Jacquard or Dobby weaving processes.

A weave pattern that may be used to form the layers 90, 92, and 94 and interconnect the layers to form the first and second panels 40 and 42 of the inflatable curtain 14 is illustrated in FIG. 4. The weave pattern illustrated in FIG. 4 is illustrative only of one such manner by which to construct the inflatable curtain 14 in a woven one piece construction. Those skilled in the art will recognize that alternative weave patterns may also be suitable for constructing the inflatable curtain 14.

As illustrated in FIG. 4, the single layer 94 of the first panel 40 and the first and second layers 90 and 92 of the second panel 42 each include warp threads 100 and weft threads 102 that are woven or interlaced through the warp threads. At the predetermined locations 96 where the first and second layers 90 and 92 are interconnected, the weft threads 102 are interlaced through a pair of common warp threads 100. At the locations where the first and second panels 40 and 42 are interconnected, i.e., at the perimeter connection 46 or the interior connection 48, the weft threads 102 of each layer are interlaced through warp threads 100 of a different layer. More specifically, the weft threads 102 of the layer 94 are interlaced through the warp threads 100 of the first layer 90. The weft threads 102 of the first layer 90 are interlaced through the warp threads 100 of the second layer 92. The weft threads 102 of the second layer 92 are interlaced through the warp threads 100 of the layer 94.

Figure 5:
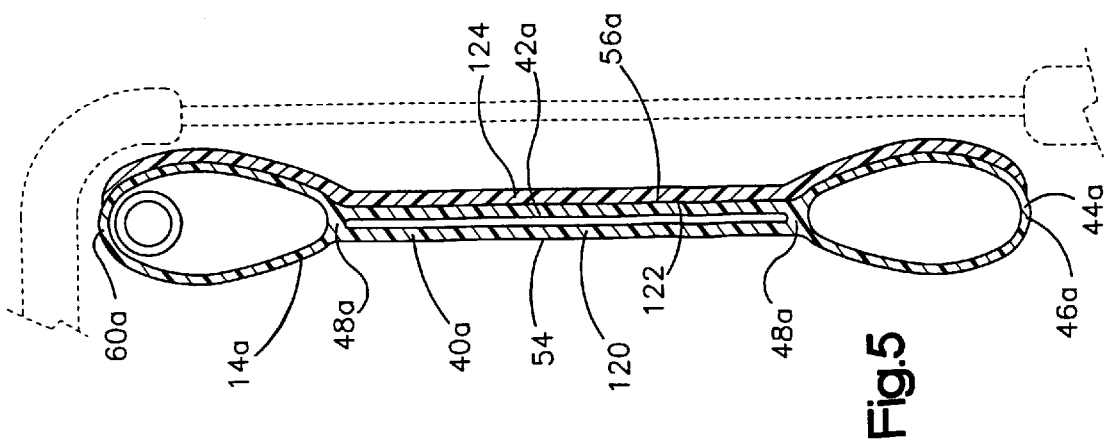
FIG. 5 is a sectional view of an apparatus for helping to protect a vehicle occupant, illustrating the apparatus in an inflated condition, according to a second embodiment of the invention.

A second embodiment of the present invention is illustrated in FIGS. 5 and 6. The second embodiment of the invention is similar to the first embodiment of the invention illustrated in FIGS. 1–4. Accordingly, numerals similar to those of FIGS. 1–4 will be utilized in FIGS. 5 and 6 to identify similar components, the suffix letter "a" being associated with the numerals of FIGS. 5 and 6 to avoid confusion. The second embodiment of the present invention is identical to the first embodiment (FIGS. 1–4), except that additional, non-interwoven layers of material are connected to the outer surface 56a of the second panel 42a (FIGS. 5 and 6) to reinforce the second panel.

As illustrated in FIG. 5, the inflatable curtain 14a has a woven one piece construction similar to the construction of the inflatable curtain 14 (FIGS. 1–4) of the first embodiment. Each of the first and second panels 40a and 42a of the inflatable curtain 14a (FIGS. 5 and 6), however, includes a single layer of material 120 and 122, respectively. The first and second overlying panels 40a and 42a are interconnected along a perimeter connection 46a and may be interconnected at interior connections 48a. The layers 120 and 122 of the first and second panels 40a and 42a are preferably constructed of woven nylon. Preferably, the first and second panels 40a and 42a are interconnected to form the inflatable curtain 14a by interweaving the panels simultaneously in a manner similar to that disclosed in the embodiment of FIGS. 1–4.

Those skilled in the art will recognize that the inflatable curtain 14a may be constructed by methods other than a woven one piece construction. For example, the inflatable curtain 14a could be formed from a sheet of material that is folded over along the top edge 60a of the curtain to form the overlying first and second panels 40a and 42a. Alternatively, the first and second panels 40a and 42a could be formed from separate sheets of material arranged in an overlying manner and interconnected along the entire perimeter 44a of the inflatable curtain 14a.

In the embodiment illustrated in FIGS. 5 and 6, the inflatable curtain 14a includes a reinforcing layer of material 124 that reinforces the second panel 42a. The reinforcing layer 124 is connected to the layer 122 of the second panel 42a on the outer surface 56a of the second panel. The reinforcing layer 124 may be constructed of the same type of material used to construct the layers 120 and 122 of the first and second panels 40a and 42a, i.e., woven nylon. Alternatively, the reinforcing layer 124 could be constructed of a material different than the material used to construct the layers 120 and 122, such as a woven or non-woven fabric. Thus, the material used to construct the reinforcing layer 124 may be selected to reinforce the second panel 42a. Such materials may include polyester or high-strength materials, such as Kevlar™ aramid fibers.

The inflatable curtain 14a of the second embodiment is coated with a laminate material 130 (FIG. 6) disposed on the outer surfaces 54a and 56a of the first and second panels 40a and 42a, respectively. The laminate material 130 preferably consists of a polymeric material, such as a plastic material, and thus may help to reinforce the first and second panels 40a and 42a and also helps block leakage of inflation fluid from the inflatable curtain 14a. The reinforcing layer 124 is preferably connected to the outer surface 56a by the laminate material 130. The reinforcing layer 124 could, however, be connected to the second panel 42a by alternative means, such as by an adhesive or by stitching the reinforcing layer to the second panel in non-inflatable areas of the inflatable curtain 14a.

The laminate material 130 is preferably a sheet of material applied to the first and second panels 40a and 42a by applying a combination of heat and pressure, such as by a heated roller. If the reinforcing layer 124 is connected to the second panel 42a by the laminate material 130, the reinforcing layer may be connected to the second panel simultaneously with the laminate material. More specifically, the laminate material 130 could be applied to the first and second panels 40a and 42a and the reinforcing layer 124 could be placed overlying the laminate material on the second panel. The reinforcing layer 124 could then be connected to the second panel 42a via the laminate material by applying heat and pressure as discussed above.

Those skilled in the art will recognize that, in laminating the outer surfaces 54a and 56a of the first and second panels, a potential problem known as "blocking" may occur. "Blocking" refers to the situation where laminated materials tend to stick together when pressed against each other, especially over long periods of time and especially in a heated environment.

Blocking can occur when an externally laminated inflatable curtain is folded or rolled in a stored position in a vehicle. In this instance, the laminate material on an outboard panel may be folded or rolled into a position adjacent laminate material on an inboard panel when the curtain is in the stored position. As a result, blocking may impede proper deployment of the inflatable curtain, which could negatively affect the ability of the curtain to help protect an occupant of the vehicle.

It may be desirable, therefore, to select laminate materials having a low tendency to block for coating inflatable curtains. An example of one such non-blocking material is a laminate material comprising a mixture of urethane and nylon. Non-blocking materials, however, may be expensive and may not possess the bonding ability required to connect the reinforcing layer 124 to the second panel 42a. In the embodiment illustrated in FIGS. 5–6, materials with low blocking tendencies and materials with relatively high blocking tendencies can be used because the laminate material 130 coating the outer surface 56a of the second panel 42a is disposed between the second panel and the reinforcing layer 124. The laminate material 130 on the second panel 42a is thus isolated from being positioned adjacent the laminate material on the first panel 40a. The inflatable curtain 14a can be folded or rolled into a stored position in which laminated surfaces of the curtain are not positioned adjacent to each other. This construction helps prevent blocking of the laminated panels of the inflatable curtain 14a.

From the above description of the invention, those skilled in the art will perceive improvements, changes and modifications. For example, in the illustrated embodiments, the first panel includes a single layer of fabric material and the second panel includes two layers of fabric material. The first and second panels, however, each may include more layers of fabric material. For example, the first panel may include two layers of material and the second panel may include three layers of material. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is adapted to inflate away from the vehicle roof into a position between the side structure of the vehicle and a vehicle occupant, said inflatable vehicle occupant protection device comprising woven first and second overlying panels that are interwoven with each other to define an inflatable volume, said first panel being constructed of a single layer of woven material, said second panel being constructed of at least two layers of woven material that are interwoven with each other, said single layer of said first panel and said at least two layers of said second panel each covering substantially identical portions of the vehicle side structure.

2. Apparatus as defined in claim 1, wherein said second panel is positioned adjacent the side structure of the vehicle when said inflatable vehicle occupant protection device is inflated.

3. Apparatus as defined in claim 1, wherein said inflatable vehicle occupant protection device has a woven one piece construction.

4. Apparatus as defined in claim 1, wherein said at least two layers of said second panel are interwoven at predetermined locations on said second panel.

5. Apparatus as defined in claim 1, further comprising a gas impermeable material coating said first and second panels.

6. Apparatus as defined in claim 5, wherein said inflatable vehicle occupant protection device has a generally gas tight construction.

7. An inflatable vehicle occupant protection device that is adapted to inflate away from a roof of a vehicle into a position between a side structure of the vehicle and a vehicle occupant, said inflatable vehicle occupant protection device comprising:

a first panel comprising a first layer of woven material, said first layer covering certain portions of the side structure when the inflatable vehicle occupant protection device is inflated;

a second panel comprising second and third layers of woven material that are interwoven with each other at selected locations to interconnect said second and third layers, said second and third layers covering portions of the side structure substantially identical to the portions covered by said first layer when the inflatable vehicle occupant protection device is inflated;

said first and second layers being interwoven with each other at selected locations to interconnect said first and second panels and to help define an inflatable volume of said inflatable vehicle occupant protection device.

8. Apparatus as defined in claim 1, wherein said single layer of said first panel and said at least two layers of said second panel each have respective peripheries interconnected with each other to define a periphery of said inflatable vehicle occupant protection device, said periphery defining bounds of the portions of the side structure covered by said layers of said first and second panels.

9. Apparatus as defined in claim 1, wherein said single layer of said first panel and said at least two layers of said second panel each have a substantially identical shape and size.

10. Apparatus as defined in claim 1, wherein said single layer of said first panel and said at least two layers of said second panel extend from an A pillar of the vehicle to a C pillar of the vehicle when said inflatable vehicle occupant protection device is inflated.

11. Apparatus as defined in claim 1, wherein said single layer of said first panel and said at least two layers of said second panel each cover at least a portion of the A pillar, C pillar, and a B pillar of the vehicle when said inflatable vehicle occupant protection device is inflated.

12. Apparatus as defined in claim 1, wherein said inflatable vehicle occupant protection device is an inflatable curtain having a stored position extending along the side structure adjacent to the vehicle roof when said inflatable curtain is in said stored position.

13. Apparatus as defined in claim 12, further comprising an inflation fluid source that provides inflation fluid for inflating said inflatable curtain, and means for directing said inflation fluid into said inflatable volume to inflate said inflatable curtain.

14. Apparatus as defined in claim 13, wherein said means for directing said inflation fluid comprises a fill tube having a portion located in said inflatable curtain.

15. Apparatus as defined in claim 14, further comprising a sensor for sensing a vehicle condition for which deployment of said inflatable curtain is desired, said sensor actuating said inflation fluid source to provide inflation fluid to inflate said inflatable curtain.

16. Apparatus as defined in claim 13, wherein said inflation fluid source comprises an inflator that is actuatable to inflate said inflatable curtain.

* * * * *